(12) United States Patent
Medbo et al.

(10) Patent No.: US 8,494,588 B2
(45) Date of Patent: Jul. 23, 2013

(54) METHOD AND APPARATUS FOR IMPROVING THE PERFORMANCE OF A MOBILE RADIO COMMUNICATIONS SYSTEM BY ADJUSTING ANTENNA PATTERNS

(75) Inventors: Jonas Medbo, Uppsala (SE); Mathias Riback, Danderyd (SE); Jan-Erik Berg, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 671 days.

(21) Appl. No.: 12/667,817

(22) PCT Filed: Jun. 6, 2007

(86) PCT No.: PCT/SE2007/050512
§ 371 (c)(1),
(2), (4) Date: May 27, 2010

(87) PCT Pub. No.: WO2009/008789
PCT Pub. Date: Jan. 15, 2009

(65) Prior Publication Data
US 2010/0298015 A1 Nov. 25, 2010

(51) Int. Cl.
*H04B 7/00* (2006.01)
*H04B 1/00* (2006.01)
*H04M 1/00* (2006.01)

(52) U.S. Cl.
USPC ........ 455/562.1; 455/524; 455/561; 455/525; 455/560

(58) Field of Classification Search
CPC .................................................... H04Q 21/29
USPC ............. 455/522, 69, 450, 452.1, 562.1, 524, 455/561, 560
See application file for complete search history.

(56) References Cited

U.S. PATENT DOCUMENTS 5,280,472 A * 1/1994 Gilhousen et al. ............ 370/335
5,513,176 A * 4/1996 Dean et al. .................... 370/335
(Continued)

FOREIGN PATENT DOCUMENTS

EP 1432144 A2 6/2004
JP 11252614 A 9/1999
(Continued)

OTHER PUBLICATIONS

Ihara, T. et al. "Efficient Common Channel Transmission Employing Multi-Beam Antenns in W-CDMA Forward Link." The 8th International Conference on Communication Systems, 2002 (ICCS 2002), Piscataway, NJ, US, Nov. 25-28, 2002.

*Primary Examiner* — Tilahun B Gesesse
(74) *Attorney, Agent, or Firm* — Coats & Bennett, P.L.L.C.

(57) ABSTRACT

The present invention relates to a method of improving the performance of a mobile radio communications system comprising at least one stationary radio transmitter for communicating with user equipments in the communications system, wherein the radio transmitter is connected to an antenna system for which the antenna pattern can be varied, the method comprising: receiving direction-of-propagation information relating to a plurality of user equipment transmission samples; selecting, based on the direction-of-propagation information, active directions for the communication of common channels from the radio transceiver; and adjusting the antenna pattern used for communication of common channels in accordance with the selected active directions in a manner so that the gain of at least one direction which has not been selected as active is lower than the gain of the selected active directions.

21 Claims, 8 Drawing Sheets

U.S. PATENT DOCUMENTS

| | | | | |
|---|---|---|---|---|
| 5,533,011 A * | 7/1996 | Dean et al. | | 370/342 |
| 5,973,638 A * | 10/1999 | Robbins et al. | | 342/172 |
| 6,005,884 A * | 12/1999 | Cook et al. | | 375/132 |
| 6,236,363 B1 * | 5/2001 | Robbins et al. | | 342/360 |
| 6,415,163 B1 * | 7/2002 | Keskitalo et al. | | 455/562.1 |
| 7,577,398 B2 * | 8/2009 | Judd et al. | | 455/11.1 |
| 8,010,042 B2 * | 8/2011 | Judd et al. | | 455/11.1 |
| 8,238,318 B1 * | 8/2012 | Negus | | 370/338 |
| 8,311,023 B1 * | 11/2012 | Negus | | 370/338 |
| 8,358,970 B2 * | 1/2013 | Judd et al. | | 455/11.1 |
| 8,385,305 B1 * | 2/2013 | Negus et al. | | 370/338 |
| 2004/0110469 A1 * | 6/2004 | Judd et al. | | 455/15 |
| 2007/0140177 A1 * | 6/2007 | Li et al. | | 370/335 |
| 2009/0005120 A1 * | 1/2009 | Ylitalo | | 455/562.1 |
| 2010/0029197 A1 * | 2/2010 | Judd et al. | | 455/11.1 |
| 2011/0034179 A1 * | 2/2011 | David et al. | | 455/456.1 |
| 2011/0309980 A1 * | 12/2011 | Ali et al. | | 342/368 |
| 2011/0312269 A1 * | 12/2011 | Judd et al. | | 455/11.1 |
| 2013/0044028 A1 * | 2/2013 | Lea et al. | | 342/359 |

FOREIGN PATENT DOCUMENTS

| | | |
|---|---|---|
| JP | 2006005822 A | 1/2006 |
| WO | 99/60809 | 11/1999 |

* cited by examiner

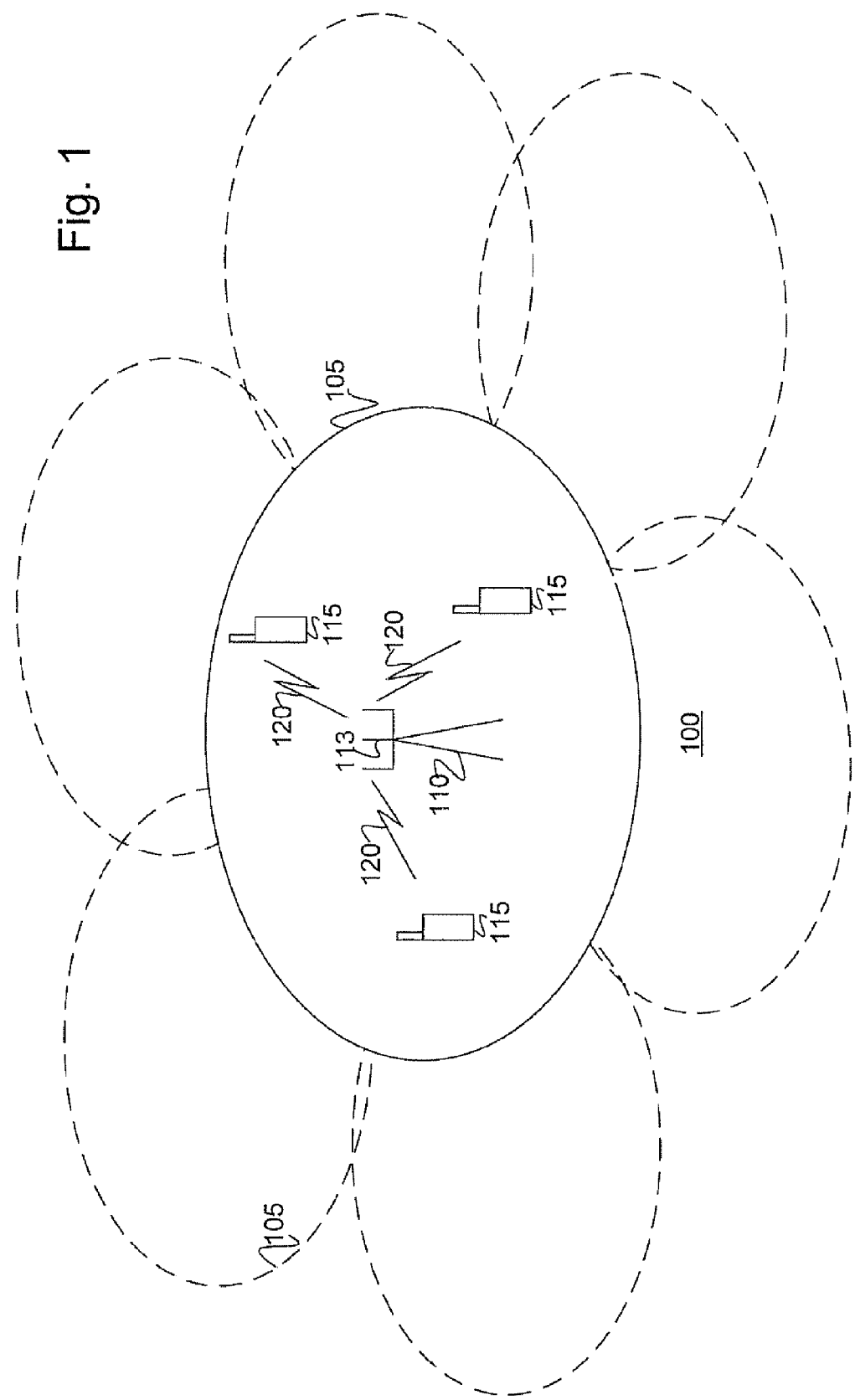

METHOD AND APPARATUS FOR IMPROVING THE PERFORMANCE OF A MOBILE RADIO COMMUNICATIONS SYSTEM BY ADJUSTING ANTENNA PATTERNS

TECHNICAL FIELD

The present invention relates to the field of mobile radio communications, and in particular to the transmission of common radio channels within a mobile radio communications system.

BACKGROUND

In a cellular mobile radio communications system, it is of utmost importance to keep the interference between cells at a minimum, in order to minimise disturbances on a radio connection. This can be achieved in a cell by using frequencies that are well separated, in the frequency domain, from the frequencies used in nearby cells and by keeping the frequency re-use distance sufficiently large. However, since the frequency span available for mobile radio communication is limited, a large frequency re-use distance means low capacity of the mobile radio communication system. Hence, it is desirable to find ways of reducing the frequency re-use distance, while keeping interference between cells at a minimum.

In order to achieve a reduced frequency re-use distance while reducing interference, beam-forming antennas may be used for the dedicated channels, so that a signal carrying a dedicated channel, intended for a particular user equipment, is transmitted by a beam-forming antenna transmitting a beam in the direction in which the user equipment is located in relation to the transmitting radio base station. The beam-forming may be achieved by use of fixed beam-forming antennas, for which the shape and direction of the transmitted beam is fixed or quasi-fixed, or by adaptive beam-forming antennas, for which the direction and/or shape of the beam is adjusted in response to a signal received from the user equipment for which the signal transmitted from the beam-forming antenna is intended.

By using beam-forming antennas for the dedicated channels, the interference on nearby cells caused by the transmission of dedicated channels within a cell can be reduced, as well as the energy consumption of a radio base station. However, for the common channels, such as for example a random access channel, broadcast channels and pilot channels, the situation is different. A common channel should be detectable by all user equipments in a cell, including those user equipments that have not yet performed random access. Hence, since the location of, or even the existence of, potential receivers of a common channel signal is not know, the common channel signal cannot be transmitted in a particular direction corresponding to the direction of the location of the intended receiver.

SUMMARY

A problem to which the present invention relates is the problem of how to improve the performance of a mobile radio communications system.

This problem is addressed by a method of improving the performance of a mobile radio communications system comprising at least one stationary radio transmitter for communicating with user equipments in the communications system, wherein the radio transmitter is connected to an antenna system for which the antenna pattern can be varied. The method comprises receiving direction-of-propagation information relating to a plurality of user equipment transmission samples, wherein a user equipment transmission sample includes information relating to at least one direction of propagation by which successful communication between a user equipment and the radio transmitter has been established at a particular point in time. The method further comprises selecting, based on the direction-of-propagation information, active directions for the communication of common channels from the radio transmitter; and adjusting the antenna pattern used for communication of common channels in accordance with the selected active directions in a manner so that the gain of at least one direction which has not been selected as active is lower than the gain of the selected active directions.

The problem is further addressed by an apparatus for improving the performance of a mobile radio communications system, wherein the mobile radio communications system comprises at least one user equipment and at least one stationary radio transmitter connected to an antenna system (113) for which the antenna pattern can be varied. The inventive apparatus comprises receiving means arranged to receive direction-of-propagation information relating to a plurality of user equipment transmission samples, wherein a user equipment transmission sample includes information relating to at least one direction of propagation by which successful communication between a user equipment and a radio transmitter has been established at a particular point in time. The apparatus further comprises selecting means arranged to select, based on the direction-of-propagation information, active directions for the communications of common channels from the radio transmitter; and adjusting means arranged to adjust the antenna pattern used for communication of common channels in accordance with the selected active directions in a manner so that the gain of at least one direction which has not been selected as active is lower than the gain of the selected active directions.

By the invention is achieved that common channels may be communicated in a mobile radio communications system by means of a beam-formed antenna pattern. The interference within the mobile radio communication system can be reduced, and the relation between radio coverage and power consumption can be improved.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a schematic illustration of a cell in a mobile radio communications system.

DETAILED DESCRIPTION

Figure 2A:
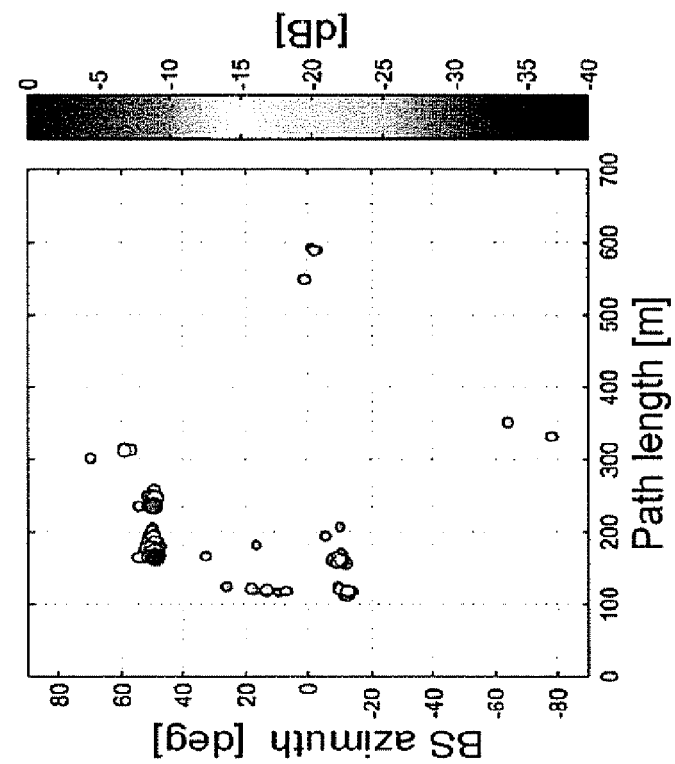
FIG. 2 is a graph showing measurement points corresponding to directions of arrival at a radio base station for an indoors location of a user equipment (FIG. 2a) and directions of arrival for the same radio base station for an outdoors location of a user equipment (FIG. 2b).

A mobile radio communications system 100 is schematically illustrated in FIG. 1a. The coverage area of the mobile radio communications system 100 is divided into a number of cells 105, each being served by a radio transceiver in a radio base station 110. The radio base station further comprises an antenna system 113, which can include one or more antennas. A plurality of user equipments 115 in a cell 105 can communicate via the radio base station 110 by use of a radio interface 120.

In mobile radio communications systems, beam forming antennas may be used for transmitting dedicated channels to user equipments 115. The antenna pattern, and thus the intensity, of a beam-formed radio beam is generally concentrated to a certain part or parts of the cell 105, and the beam-formed radio beam can be used for communication with user equipments 115 located within a volume in which the radio energy is sufficient. If the beam-formed radio beam is generated by use of an antenna system 113 capable of adaptive beam forming, the direction and/or shape of the antenna pattern of a beam-formed radio beam may vary over time.

Beam-forming antennas may advantageously be used for the communication of dedicated radio channels to/from particular user equipments 115 for which the location is known. The use of beam-forming antennas for the transmission of common channels from the radio base station 110 has traditionally been considered to be unsuitable, since the common channels need to detectable all over the nominal coverage area of the cell 105.

However, according to the invention, beam-forming antennas can be used for the communication of common channels, provided that the radio transmission properties of the area surrounding the radio base station 110 can be estimated.

Studies of the propagation paths of radio signals have shown that the Direction of Arrival (DoA) of a radio beam at a radio base station 110 is often determined by objects nearby the radio base station 110, in elevation and azimuth as well as in polarisation. Hence, for many base station installations, the dependency of the DoA on the location of a user equipment 115 with which the radio base station 110 communicates is small (see "*MIMO Channel Characteristics in a Small Microcell*", J. Medbo, M. Riback and J-E Berg, Proceedings of IEEE VTC'05, Dallas, September 2005 and "*Wideband 3-D Characterization of Mobile Radio Channels in Urban Environment*", J Laurila et al., IEEE Transactions on Antennas and Propagation, Vol. 50, No. 2, pp. 233-243).

The present invention uses the findings of such studies in order to allow for beam-forming of common channel communication. By using collected information relating to the Direction of Arrival of radio signals arriving at the radio base station 110, and/or relating to the Direction of Departure of radio signals transmitted from the radio base station 110 to user equipments 115, the shape of the antenna pattern of radio beams used for common channel transmission from a radio base station 110 may be adjusted so that the antenna pattern covers less than the nominal coverage in azimuth, and/or elevation, and/or polarisation, of the radio base station 110, while still providing sufficient coverage. For example, if the radio base station 110 is located at a 3-sector site, the nominal coverage in azimuth would generally be 120 degrees. By using the teachings of the invention, the antenna pattern used for transmission of common channels may be adjusted so that it does not cover all 120 degrees in azimuth, while still obtaining coverage in all active directions in the cell 105. The term antenna pattern should here be construed as the directional dependence of intensity of the radiation from the radio base station 105, which can also be expressed as the gain as a function of direction in azimuth, elevation and/or polarisation.

FIG. 2 illustrates an example of DoA measurements obtained for a radio base station 110 by measuring the incident azimuth angle for signals received from a user equipment 115 located at two significantly different locations. Similar graphs could be plotted for measurements of the elevation angle, and for the polarization of the received signal.

FIG. 2

Figure 2B:
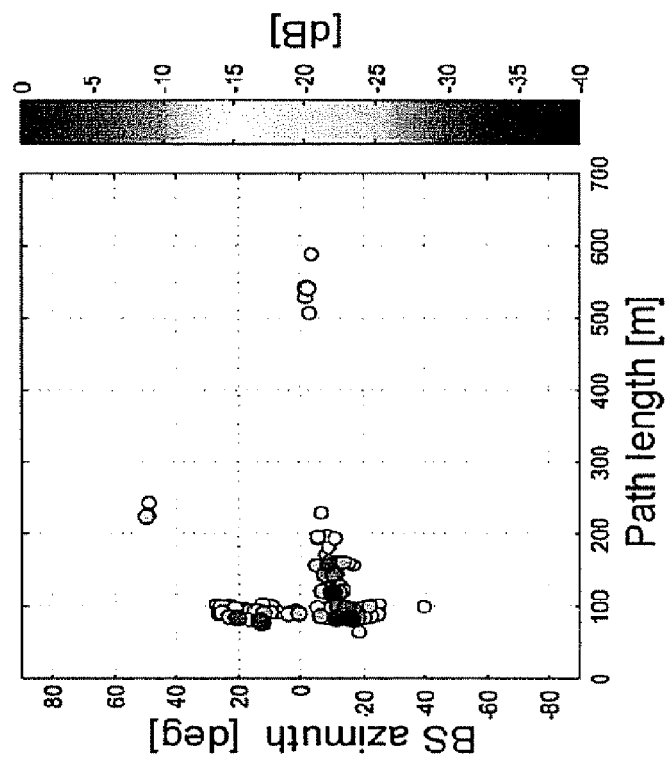

FIG. 2a shows measurements of signals received from the user equipment 115 when located at an indoors location, while FIG. 2b shows measurements of signals received from the user equipment 115 when located in an outdoors position. The different measurement results in each plot basically correspond to different paths taken by the measured signal. The azimuth angle measurement results are plotted versus the path length of the received signal, and the signal strength of a measured signal is indicated by the shade of the plotted measurement (cf. the scale to the right of the plot).

In the example of FIG. 2, it can be seen that the azimuth angle of signals incident to the radio base station 110 are very similar for the two locations of the user equipment 115 presented in FIGS. 2a and 2b. Further measurements show that such similarity is generally obtained for most locations of a transmitting user equipment 115 within a cell 105.

FIG. 3

Figure 3:
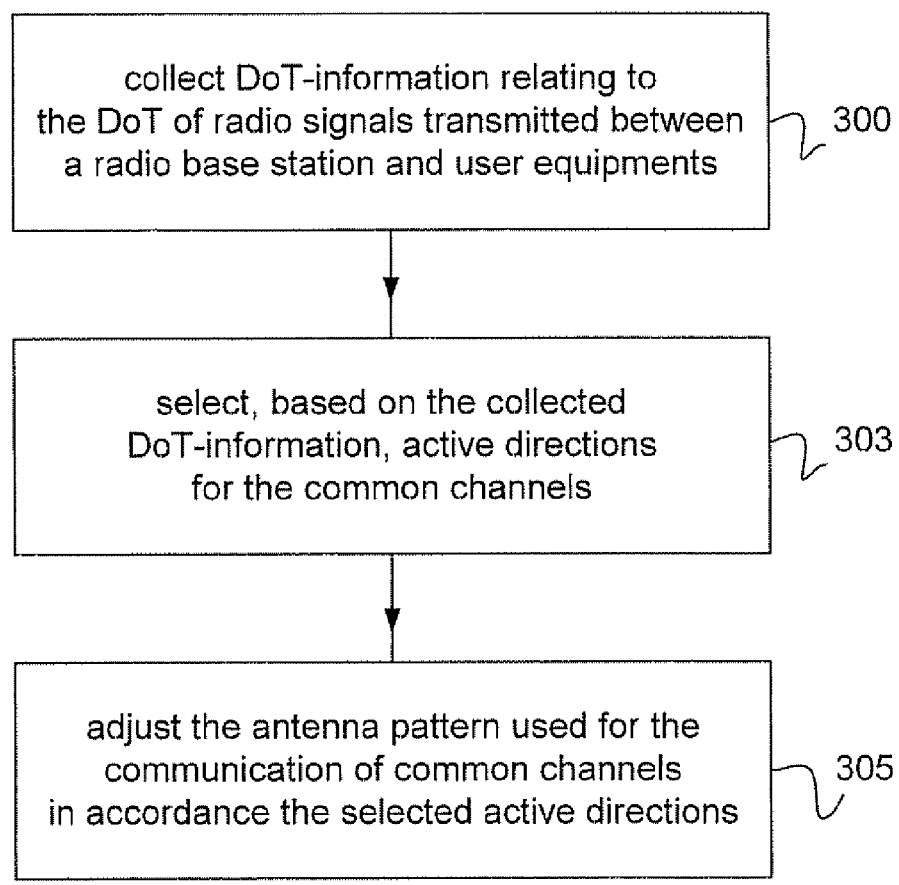
FIG. 3 is a flowchart schematically illustrating an embodiment of the inventive method.

An embodiment of the inventive method is schematically illustrated in FIG. 3. In step 300, information is collected relating to the direction of arrival and/or departure of radio signals communicated to/from a radio base station 110 from/to a plurality of user equipments 115 served by the radio base station 110. Such collected information will in the following be referred to as Direction-of-Propagation information (DoP-information), wherein the term Direction of Propagation of a node should be construed to include directions of arrival at the node as well as directions of departure from the node. The DoP-information would typically be based on a plurality of user equipment transmission samples, wherein a user equipment transmission sample includes information on at least one direction of propagation at the radio base station 110 by which successful communication between the user equipment 115 and the radio base station 110 has been established at a particular point in time (at which point in time the user equipment was at a particular location, known or unknown). A user equipment transmission sample could include all directions of transmission which could be used for communication between the radio base station 110 and the user equipment 115 at the particular point in time, or a selection of the direction of propagation yielding successful communication (for example the strongest directions).

The collection of DoP-information in step 300 may for example be performed by measuring the Direction of Arrival at the base stations 110 of signals transmitted from different user equipments 110 in the cell at different point in time, either in test sessions set-up for this purpose or in ongoing traffic sessions. DoP-information may also be obtained by identifying, for a plurality of different user equipments 115 at different (known or unknown) locations in the cell 105, directions of departure for signals that are transmitted from the radio base station 110 and that can be detected by the user equipment, either in test sessions set-up for this purpose or in ongoing traffic sessions. Yet another way of obtaining DoP-information is to perform simulations of transmissions based on the radio propagation properties of the environment in the cell 105. Long term average reciprocity of the uplink and downlink parts of a radio channel can generally be assumed, so that the transmission of a signal from a radio base station 110 in a direction from which a signal has been received from a particular user equipment 115 would result in a transmitted radio signal arriving at the location of the particular user equipment 115. In the following, the direction of a signal should be construed as at least one of the azimuth of the signal, the elevation of the signal, or the polarisation of the signal. The DoP-information of a received or transmitted signal may relate to the elevation of the signal, and/or the azimuth of the signal, and/or the polarisation of the signal.

Based on the DoP-information collected in step 300, active directions are selected in step 303 of FIG. 3, wherein an active direction is a direction that should be covered by the antenna pattern used for the transmission and/or reception of common channels. The set of active directions that are chosen in step 303 will be referred to as the active area. Generally, it is desirable to identify, in step 303, the minimum active area (azimuth, elevation and/or polarimetric area) of an antenna pattern to be used for the common channels that would achieve the desired coverage area.

In step 305, the antenna pattern used for the transmission of common channels within the cell 105 is adjusted in accordance with the active directions selected in step 303 in a manner so that the radio energy transmitted in the non-active directions is reduced compared to the radio energy transmitted in the active directions. The radio energy transmitted in the non-active directions should advantageously be minimised. For example, if the selected active directions appear in a set of direction clusters, the antenna pattern used for the transmission of common channels could advantageously be adjusted to cover this set of direction clusters, while the transmitted radio energy in directions not included in the set of direction clusters should preferably be minimised.

Moreover, the gain of the antenna pattern may vary between different active directions, so that the gain in one active direction is higher than the gain in another active direction, depending for example on path loss in the different directions, on the shape of the nominal coverage area of the cell 105, etc. The gain of the antenna pattern in the active directions may be adapted to optimise the coverage, transmit power and interference of the common channels. In a special case of the method of FIG. 3, a non-zero gain is desired in all the nominal transmission directions, and the desired gain of the antenna pattern is a function of direction. This special case can be seen as if the direction(s) having the lowest gain have not been selected as active direction(s) but are non-active directions. That is, in this special case, the gain in a non-active direction is not minimised, but set at a comparatively low value.

If the collection of DoP-information is performed in an entity different to the entity in which the selection of active directions is performed, for example if the collection is performed in user equipments 115 or a computer system used for simulations, then the flowchart of FIG. 3 would include a step of sending the DoP-information from the entity performing the collection to the entity performing the selection. Similarly, if the selection of active directions is performed outside of the radio base station 110, the flowchart would include the sending of information relating to the adjustment of the antenna pattern from the entity performing the selection to the to the radio base station 110.

In order to facilitate for easy adaptation of the antenna pattern, an antenna system 113 comprising multi-element antennas (an antenna array) could advantageously be used. In a set-up where the transmission of the antenna elements may be adjusted on an individual basis, the antenna pattern could be adjusted by adjusting the beam-forming weights of the elements of the antenna array in a suitable manner. In a set-up where the antenna arrays are connected to allow transmission in two or more fixed antenna patterns, the resulting combined antenna pattern may be adjusted by adjusting the transmission intensity of each fixed antenna pattern. For example, the fixed antenna patterns could be switched in time to cover all relevant directions/direction clusters, or two or more fixed antenna patterns could be used for transmission at the same time, with the same or different transmission power. If the fixed antenna patterns are switched, the time required to complete a switching cycle could be made rather short, since measurements show that the number of direction clusters is generally low. An alternative way of obtaining an adaptive antenna pattern is to use an antenna system 113 comprising electromechanical means for mechanically tilting and/or rotating the antennas of an antenna array of the antenna system 113.

The same antenna system 113 that is used for transmission of common channels may also be used for the collection of DoP-information in step 300 of FIG. 3. When the collection of DoP-information is performed by use of the antenna system 113, a number of radio chains (>1) in the uplink could preferably be used in the antenna system 113, wherein the term radio chain refers to the radio frequency part of a receiver and/or transmitter. When the collection of DoP-information in step 300 is performed by means of measuring the Direction of Arrival of signals received at the radio base station 110, the transmitter (Tx) and receiver (Rx) radio chains of the radio base station 110 should preferably be jointly calibrated in order to secure appropriate adaptation of the antenna pattern to the active directions selected in step 303. However, if switched fixed antenna patterns are used both for measuring the received power in the uplink in order to obtain DoP-information, and for transmission in the downlink, no calibration of the base station radio chains is necessary.

In an initial phase of the DoP-information collection, the strong directions of transmission for different locations of a user equipment 115 are not know. However, a radio base station 110 can be made to adaptively learn its environment. As the DoP-information collection (also referred to as DoP training) is performed, a number of directions of transmission will generally start to converge into a set of direction clusters. In order to improve the reliability of the DoP-information, the collection of DoP-information of step 300 of FIG. 3 should preferably include the collection of a plurality of user equipment transmission samples obtained at different points in time, so that a long term aggregate distribution can be formed of directions of transmission in which successful communication with user equipments 115 at different locations (known or unknown) can be been achieved. Furthermore, by collecting a long term aggregate distribution, the reciprocity of the uplink and downlink parts of the signal is improved. If a long term aggregate distribution is used as the DoP-information, only very small power differences between uplink and downlink parts of a radio channel are to be expected in the case of Frequency Division Duplex (FDD), since the effects of fast fading would be averaged out. This applies to CDMA as well as FDMA/TDMA systems. Reliable measurements could hence be obtained by collecting the DoP-information exclusively from signals received at the radio base station 110.

Furthermore, the DoP-information should preferably be updated from time to time, since the conditions for radio transmission in the cell 105 may vary over time—for example as buildings in the vicinity of the radio base station 110 are raised or demolished, the landscape is altered, etc. The selection of active directions and adjustment of the antenna pattern performed in steps 303 and 305 of FIG. 3 should preferably be updated accordingly.

In one implementation of the invention, the DoP-information may be collected at regular intervals, either by obtaining DoP-information from signals of on-going sessions in the mobile radio communications system 100, or by sending test signals from which the DoP-information may be obtained. The collection of DoP-information could advantageously be performed at rather close intervals, for example, each time a signal in an on-going session is received, or once per on-going session, and a long term aggregate distribution of directions of transmission in which successful communication with a user equipment 115 has been achieved may then be more or less continuously updated. The adjustment of the antenna pattern for transmission of common channels in accordance with the collected DoP-information (cf. step 305 of FIG. 3), could, for processing economy reasons, typically be performed less frequently, such as daily, weekly or fortnightly. The long term aggregate distribution could for example include user equipment transmission samples obtained during a particular time window, such as for example during the last 10 or 30 days.

The collection of new DoP-information and/or the adjusting of the antenna pattern in accordance with DoP-information obtained, can for example be triggered at regular intervals, as suggested above. The collection of new DoP-information and/or adjusting of the antenna pattern may also be triggered by the other events, such as the poor performance of the cell 105 in terms of e.g. lost calls or lost hand-overs. The collection and adjusting may also be triggered manually, or in any other manner. An implementation of the invention could apply one of the above triggering points, or a combination of two or more triggering events.

If the collection of DoP-information is performed by means of signals transmitted from a radio base station 110, a signal transmitted for this purpose could advantageously include a direction identity, identifying the directions into which the signal was transmitted. The direction identity could then be reported back by the user equipment 105 to the radio base station 110 (or to another node that would perform the analysis of the DoP-information of step 303), in this way providing information of the fact that the signal carrying this direction identity was received at the user equipment 115. Hence, a user equipment 115 would in this embodiment be adapted to identify a direction identity in a radio signal received from a radio base station 110, and to send, to the radio base station 110 from which the direction identity was received, a radio signal indicative of the direction identity. Information relating to the signal strength of the received signal could advantageously also be conveyed to the radio base station 110 (or other node), in order to indicate whether the direction into which the signal was transmitted was a strong or weak direction for the particular user equipment 115. In order to yield a high resolution in the direction domain, a beam transmitted from a radio base station 110 for the purpose of obtaining DoP-information in this manner should preferably be narrow. If measurements are performed on test signals, the direction identity may be included in the test signal. Alternatively, the direction identity could for example be included in a common direction-identity channel, wherein different direction identities could advantageously correspond to different orthogonal codes. In an alternative embodiment, wherein a narrow beam is swept over a direction range, the time at which the beam was detected by a particular user equipment 115 could be correlated with the direction into which the swept beam was transmitted at the corresponding time, in order to identify which transmission directions yield a signal that can be detected by the particular user equipment 115. In this embodiment, the transmitted signal would not need to carry a direction identity.

Figure 4:
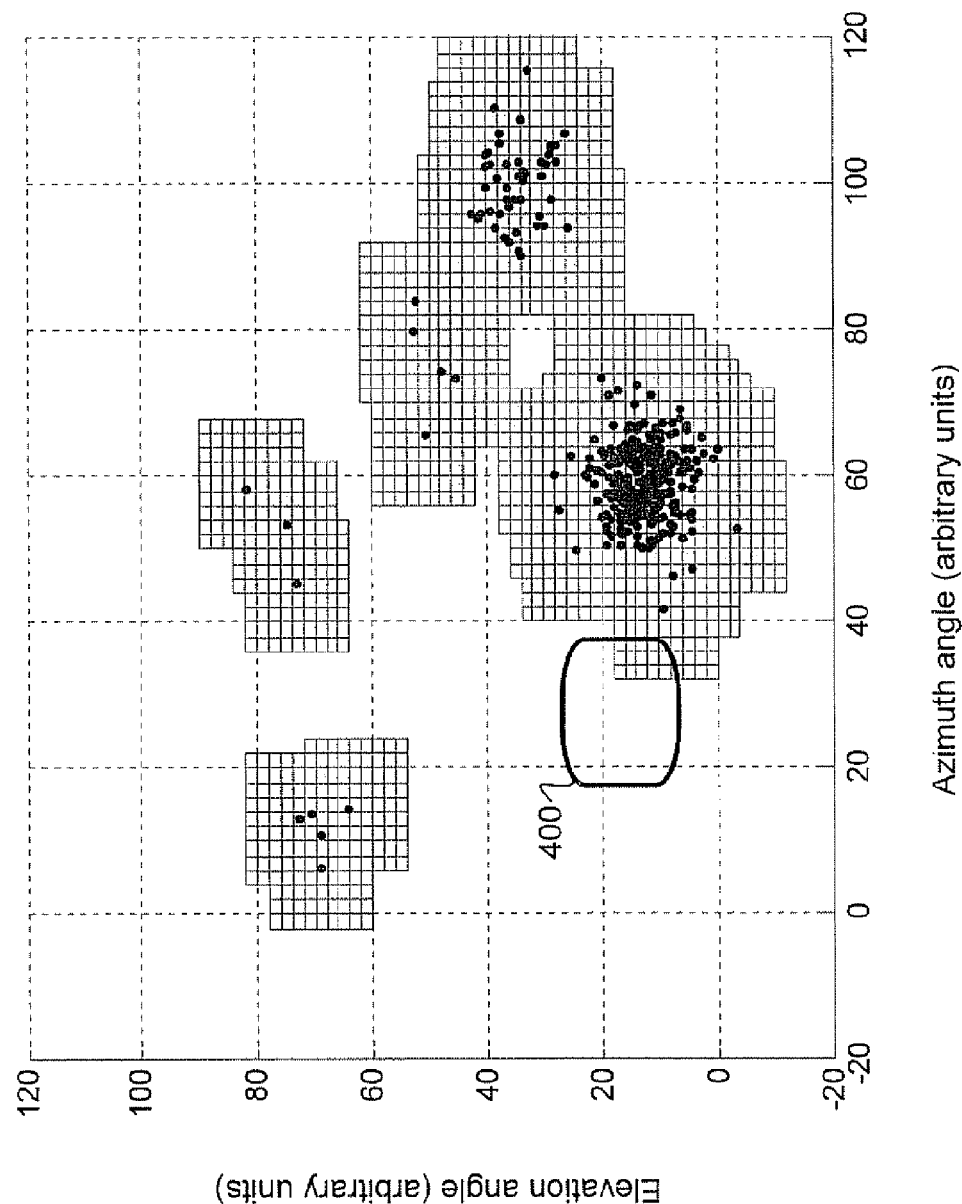
FIG. 4 is a graph wherein the direction of propagation at a radio base station has been plotted in the azimuth-elevation plane for a plurality of user equipment transmission samples (simulation result).

When a plurality of user equipment transmission samples have been obtained, each comprising at least one successful direction, it is often the case that clusters of successful directions can be identified. In FIG. 4, an example of the directions of a set of user equipment transmission samples is plotted in a diagram having the dimensions elevation angle and azimuth angle. In the example of FIG. 4, wherein successful directions are indicated by dark grey circular spots, five different clusters of successful directions can be identified. When transmitting common channels in the cell 105 to which graph of FIG. 4 relates, the antenna pattern used for the transmission of the common channels can advantageously be adapted to cover these clusters, while the energy transmitted into other directions should preferably be minimised. The areas of FIG. 4 indicated by a lighter shade of grey schematically illustrate an example of an antenna pattern that could be used in order to cover the clusters of active directions.

As discussed above, the active area (angle and/or polarization) into which the common channels need to be transmitted with maintained coverage area of a cell 105 may often be drastically reduced by identifying directions, or direction clusters, into which the transmission of a radio signal will result in that the radio signal will reach the desired coverage area of the cell 105, since the transmitted radio signal will follow different paths and the transmission in one direction can result in reception at many different locations. One way of determining the minimum active area (cf. step 300 of FIG. 3) is by trial and error—the different antenna pattern possibilities provided by the antenna system 113 could simply be compared to the DoP-information collected in step 300, and the antenna patterns that cover all relevant user equipment locations could thus be identified. The antenna pattern having the smallest beam area would then be selected as the antenna pattern to be used by the antenna system 113. Other methods may alternatively be used for determining the active area. For example, the selection of active directions for the common channels could include identifying the strongest directions for each relevant user equipment transmission sample. In addition, local power maxima in other directions may advantageously be identified for the different user equipment transmission samples. By including directions weaker than the strongest in each user equipment transmission sample and allowing the selection of a direction that is weaker than the strongest direction as an active direction, the active area may often be reduced.

FIG. 5

Figure 5:
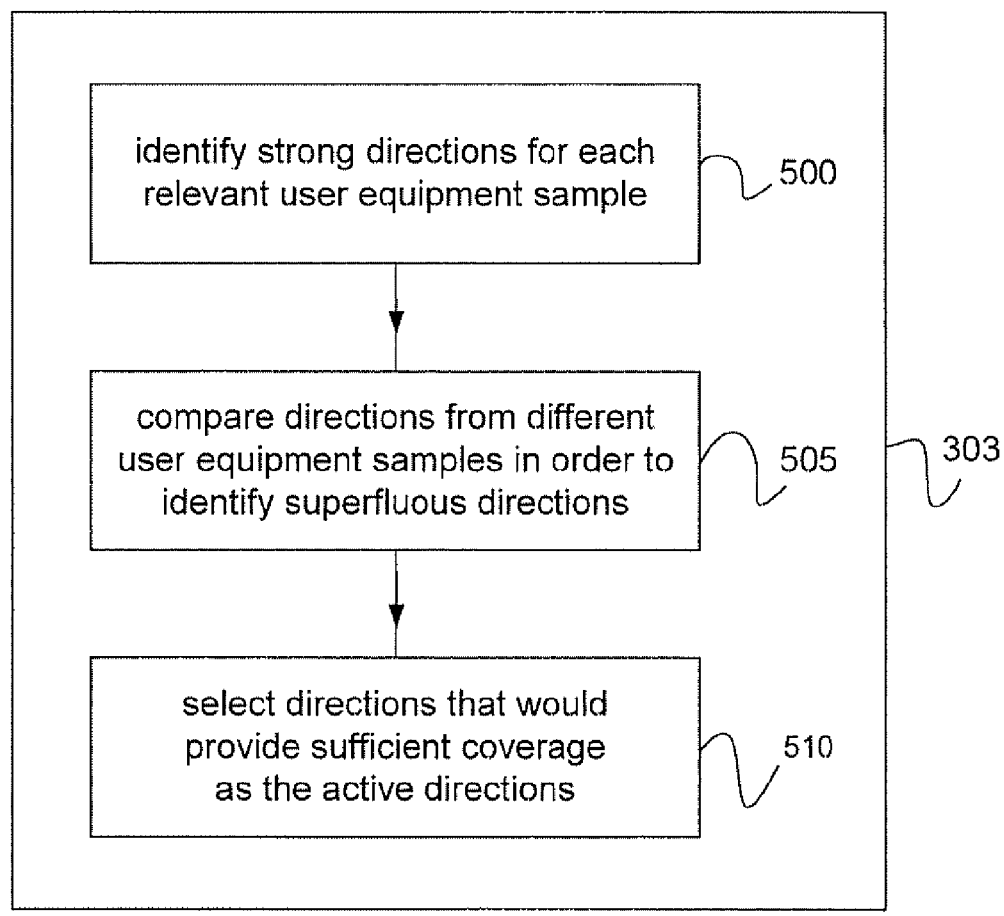
FIG. 5 is a flowchart schematically illustrating a method of selecting an active area of the common channel transmitting antenna system according to an embodiment of the inventive method.

An embodiment of selecting the active directions is schematically illustrated in the flowchart of FIG. 5, corresponding to an embodiment of step 303 of FIG. 3, where the DoP-information comprises a number of user equipment transmission samples, each including at least one DoP having yielded successful communication between a user equipment at a particular location in cell 105 at a particular point in time. In step 500, the strongest directions for the relevant user equipment transmission samples are selected. The strongest directions could for example be selected as the n strongest directions for each user equipment transmission sample, or as the directions for which the received signal strength is within a range of m dB from the strongest direction for this user equipment transmission sample, or by setting a signal strength requirement which corresponds to sufficient signal strength. Alternatively, all directions of a user equipment that have yielded successful transmission may be included in the strongest directions. In step 505, the directions from the different user equipment transmission samples are compared in order to identify superfluous directions. In step 510, directions which have not been identified as superfluous are selected as active directions.

FIG. 6

Figure 6:
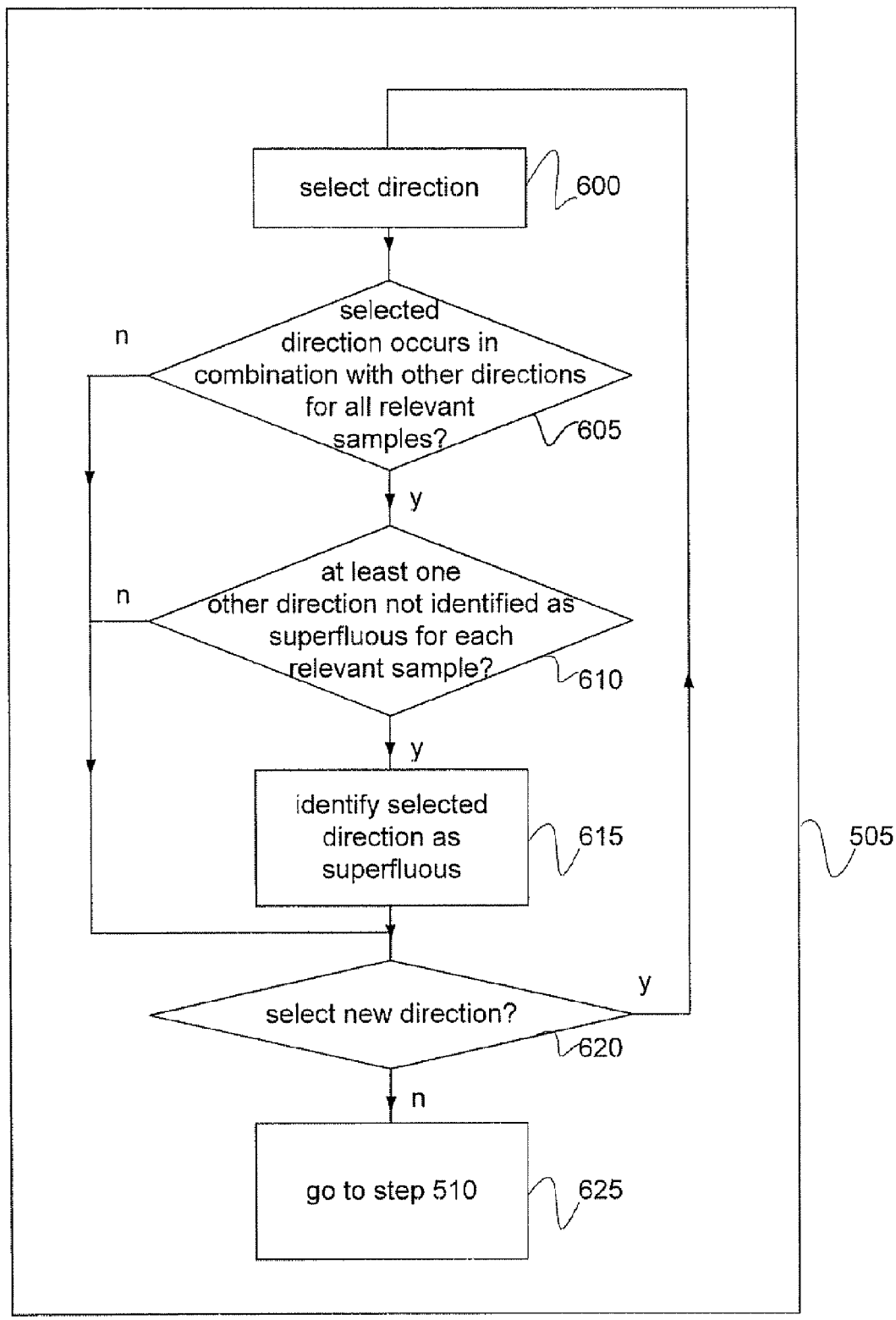
FIG. 6 is a flowchart schematically illustrating a method selecting an active area of the antenna system transmitting common channels according to an embodiment of the inventive method.

A direction can be identified as superfluous in step 505 if it occurs in combination, for each user equipment transmission sample in which it occurs, with at least one other direction that is not identified as superfluous. This is schematically illustrated in the flowchart of FIG. 6. In step 6, a direction is selected from all strong directions identified in step 500, that is, including directions that have been identified as a strong direction for any of the relevant user equipment transmission samples. In step 605, it is checked whether the direction selected in step 600 occurs in combination with other strong directions for all relevant user equipment transmission samples. If not, step 620 is entered. If so, step 610 is entered, wherein it is checked whether at least one other strong direction is not identified as superfluous for each relevant user equipment transmission sample. If this is not the case, step 620 is entered. If so, step 615 is entered, wherein the selected direction is identified as superfluous. Step 620 is then entered. In step 620, it is checked whether any new directions should be selected from the set of all strong directions. If so, step 600 is re-entered. If not, step 510 of FIG. 5 is entered. The selection of directions in step 600 may be performed in different ways. For example, directions in which signals of lower signal strength are received may be selected first, in order to give priority to the stronger directions. If two directions provide similar area coverage, the direction providing the lowest signal strength could preferably be identified as superfluous.

FIG. 7

Figure 7:
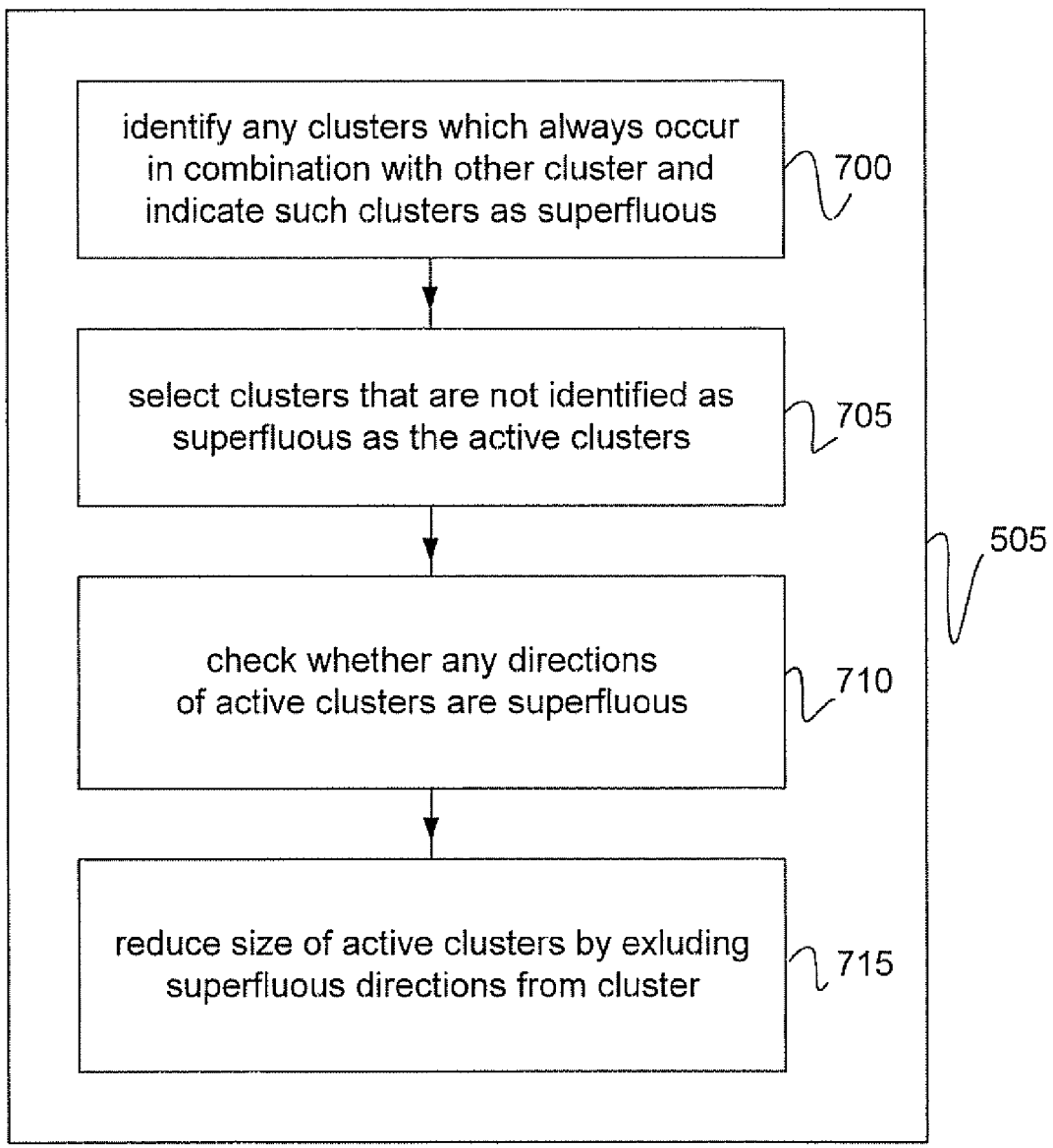
FIG. 7 is a flowchart schematically illustrating an embodiment of a method of selecting an active area when the directions of transmission at a radio base station generally are clustered.

Other methods can be used in step 505 for optimising the active directions based on information about the strongest directions for the relevant user equipment transmission samples. For example, if the strongest directions identified in step 500 generally occur in clusters (cf. FIG. 4), a method may be used in step 505 which is particularly suitable for identifying superfluous directions within a cluster. An example of such a method is schematically illustrated in FIG. 7. In step 700, any clusters which for all user equipment transmission samples occur in combination with other clusters are indicated as superfluous. This identification could be performed in a manner similar to that of FIG. 6. In step 705, the clusters which have not been indicated as superfluous are selected as the active clusters which should be covered by the antenna pattern used for transmission of common channels. In step 710, directions of a cluster are analysed, in order to check whether any directions within the active clusters are superfluous in that they always occur, for all locations for which they occur, in combination with other directions (cf. FIG. 6). This analysis could in particular be performed for the directions in the periphery of a cluster, in order to identify whether the cluster area may be reduced without reducing the coverage obtained by adapting the antenna pattern to the area of the clusters. In step 715, the cluster area is reduced by removing superfluous directions from the cluster.

A combination of discrete directions and clusters of directions may be required in order to provide the desired coverage of a cell 105, and the selection of active directions (including active clusters) can be adapted accordingly.

FIG. 8

Figure 8:
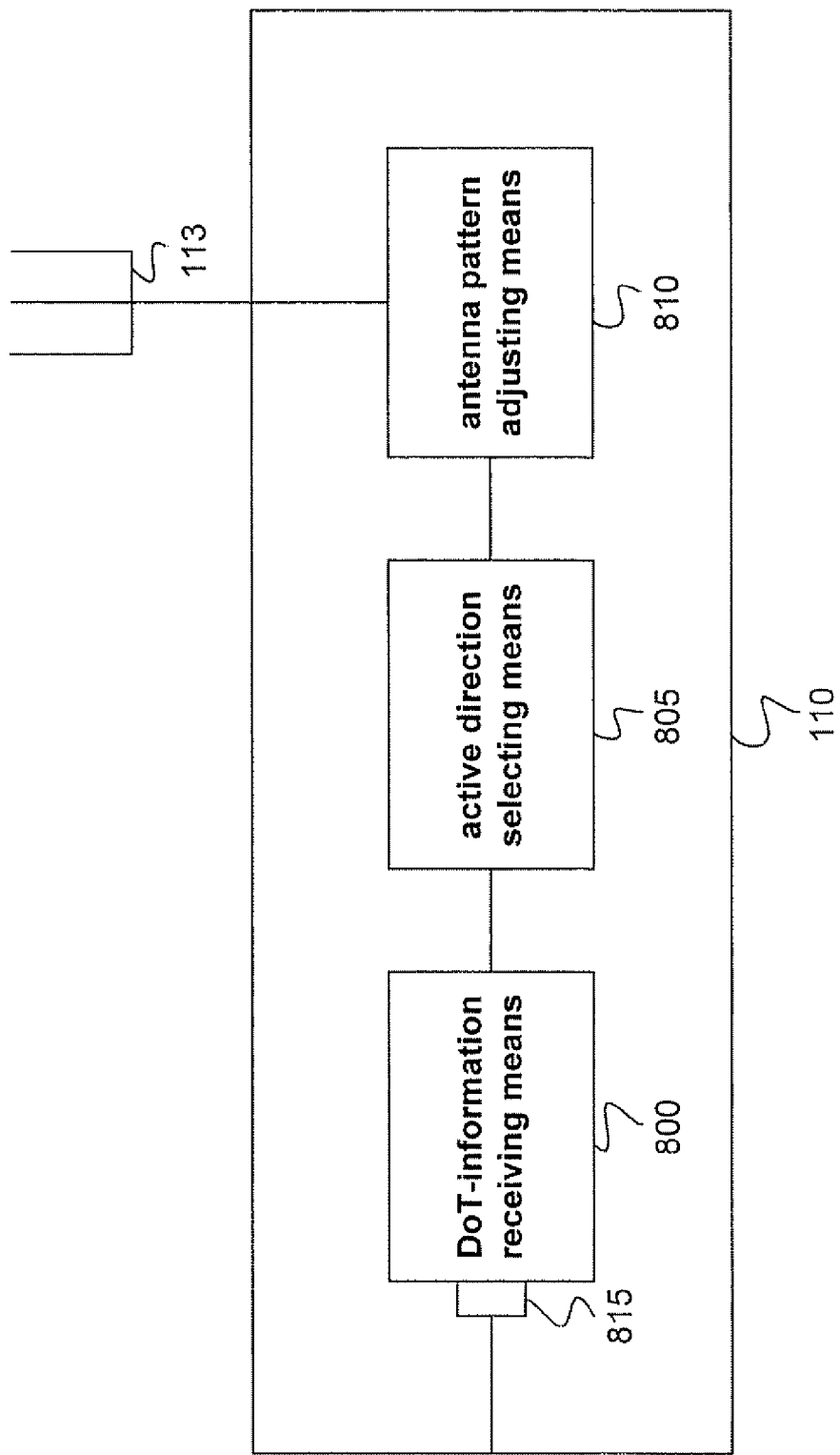
FIG. 8 is a schematic illustration of a radio base station into which including an embodiment of the invention.

FIG. 8 schematically illustrates a radio base station 110 into which the invention has been implemented. Radio base station 110 of FIG. 8 includes receiving means 800 arranged to receive direction-of-propagation information relating to a plurality of user equipment transmission samples; selecting means 805 arranged to select, based on the direction-of-propagation information, active directions for the communications of common channels from the radio base station; and adjusting means 810 arranged to adjust the antenna pattern used for communication of common channels in accordance with the selected active directions in a manner so that the gain of at least one direction which has not been selected as active is lower than the gain of the selected active directions. The receiving means 100 include a port 815 via which communication between the receiving means 100 and other nodes of mobile radio communications system 100 may be achieved. The receiving means 800 is connected to the selecting means 805 via a connection over which information relating to DoP-information may be communicated. The selecting means 805 is further connected to the adjusting means 810 via a connection over which information relating to selected directions/direction clusters/direction space sections may be transmitted. The adjusting means 810 of FIG. 8 is further connected to the antenna system 113 via a connection over which instructions relating to the adjusting of the antenna pattern used by the antenna system 113 for the transmission of common channels may be communicated. When the antenna system 113 includes adaptive antennas, such instructions typically includes beam-forming weights. When the antenna pattern of antenna system 113 is adjusted by means of electromechanical means, such instructions typically includes instructions to tilt/rotate the antenna elements of antenna system 113, etc.

In an implementation of the invention wherein the DoP-information is collected by means of measuring the direction of arrival of signals received at the radio base station 110, the receiving means 800 could include means for performing such measurements. The receiving means could then be connected to an antenna system, which could advantageously be the antenna system 113 used for transmission of common channels. In implementations of the invention wherein the collection of DoP-information is at least partly performed at the user equipment 115, the receiving means 800 could be connected to an antenna system, and advantageously to antenna system 113, in order to allow for the receiving means 800 to receive the DoP-information. In implementations where the collection of DoP-information is performed at a third node, such as a simulation node, the receiving means 800 would include an interface for receiving information from such third node. The receiving means 800, the selecting means 805 and the adjusting means 810 can be implemented by suitable software and/or hardware. In other implementations of the invention, the receiving means 800 and/or the selecting means may alternatively be implemented in other nodes than the radio base station 110.

Division of Coverage Area into Set of Smaller Direction Space Sections

In order to simplify processing of the DoP-information, the nominal coverage area of cell 105 may, in one embodiment of the invention, be divided into a set of smaller direction space sections. The collection of DoP-information could then include identifying to which direction space section(s) the successful directions of a user equipment transmission sample belongs. In this embodiment, it would be sufficient to store in the long term aggregate distribution an identification of the direction space section into which a successful direction of a user equipment transmission sample belongs, and information of the exact direction does not have to be stored. Hence, the selection of active directions would in this embodiment boil down to the selection of active direction space segments. The setting of any parameters that are required in order to adapt the antenna pattern of antenna system 113 to cover different combinations of such direction space sections could be pre-determined, and could for example be stored in a table. When the combination of direction space sections that are selected as the active direction space sections has been changed, the required new setting of any parameters could be found in such a table.

An example of a division of the nominal coverage area into a set of direction space sections is illustrated in FIG. 4, wherein a square of the co-ordinate system of FIG. 4 has been divided into one hundred direction space sections. The division of the coverage area into space sections could be made to any resolution. The resolution could advantageously correspond to the resolution at which adaptation of the antenna pattern can be efficiently performed.

In this embodiment, DoP-information in the form of an aggregate long term distribution comprising information on successful direction space sections for a plurality of user equipment transmission samples could advantageously be arranged in a matrix having at least one of the dimensions azimuth angle, elevation angle, or polarisation. Since it is often the case that clusters of successful directions can be identified, the matrix can be referred to as a cluster matrix. The cluster matrix could for example include, for each direction space section, the identities of the user equipment transmission samples for which successful communication have occurred in the particular direction space section, possibly including the power at which the signal was received in the direction space section and/or the path loss of the received signal. Alternatively, the cluster matrix could merely include the number of user equipment transmission samples for which successful communication have occurred in the direction space section. Based on the information in the cluster matrix, the direction space sections that have to be activated can be identified. If information on reception power is included in the cluster matrix, and an indication of the user equipment location at the sampling time of the user equipment transmission samples can be obtained (for example by use of the path loss, or any other means of positioning of a user equipment 115), the lowest power that needs to be used for transmission in a particular direction space section in order to obtain desired coverage may be deduced.

The graph of FIG. 4 is a graphical illustration of a cluster matrix comprising information on the number of successful user equipment samples in each of the direction space sections.

Preventive Measures for Avoiding Undesired Coverage Holes

The obtained coverage area of cell 105 is defined by the selection of active directions (cf. step 303 of FIGS. 3, 5 and 7). Hence, in order to obtain the desired coverage, the algorithm for selecting the active directions should be chosen with great care, since a badly designed selection algorithm can result in undesired coverage holes in the cell 105. Therefore, some preventive measures may advantageously be employed in order to avoid such undesired coverage holes. Please note, however, that the desired coverage area may include coverage holes compared to the nominal cell coverage—for example, if complete coverage of a geographical area would be very expensive to achieve, one may chose to allow coverage holes in the nominal coverage area.

The preventive measures can be seen as ways of updating the DoP-information collected in step 300, on the basis of which the selection of the active directions in step 303 is performed. One such preventive measure could be to temporarily include non-active directions, i.e. directions not included in the selected active area, in the active area, during a period corresponding to at least the time period required for a user equipment 115 to perform random access. This minimum time period normally varies between mobile radio communications standards, and is typically of the order of seconds. The non-active directions could for example be included with some predetermined time interval, such as for example every day, week or month, or could be included from time to time, for example when the load in the cell 105 is low. The non-active directions could be included in the active area one at a time, a few at a time, or all at once.

Another example of a preventive measure is to have an extra beam that continuously sweeps the directions that are not included in the active area. The circumference of an exemplary sweeping beam 400 is schematically illustrated in FIG. 4. A sweeping beam 400 may be swept over the coverage area of a cell 105, and when a successful direction is detected within the circumference of the sweeping beam 400, a consideration of whether the antenna pattern should be updated could advantageously be performed. The antenna pattern of a sweeping beam 400 could advantageously be of small cross-section, in order to keep the increment steps of the active area small. Once again, the beam would have to be swept at a sufficiently low speed to allow for a user equipment 115 to perform random access if hit by the beam.

If a sweeping beam 400 identifies a non-active direction in which a signal is received by the radio base station 110, or into which transmission of a signal results in the reception of a signal by a user equipment 115, the direction could advantageously be added to the DoP-information collected in step 300. If the detected successful direction is already included in the available DoP-information, no action needs to be taken. If not, a simple check could be performed as to whether the location of the user equipment for which the direction generates a successful signal is already covered by other directions, or the detection of a successful signal in a direction not included in the active area could trigger the selection of active directions of step 303. In one implementation of this aspect of the invention, a criterion for the detected successful direction to be a strong direction could be used, so that no consideration of updating the antenna pattern would be made unless the detected successful direction is strong.

If an active direction has not been included in any user equipment transmission samples for a long period of time, such direction may be removed from the active area. The non-occurrence time-period that would trig a removal of a direction should preferably be set at a rather large value, such as for example 10 or 30 days, in order keep the risk low that unintended coverage holes are created. This is particularly important for directions covering locations that are not included in the coverage area of neighbouring cells. A check of whether a location (or a user equipment transmission sample) is covered by the neighbouring cells or not could be performed prior to the removal of a direction.

Combination with Positioning of User Equipments

The invention may be combined with methods of determining the position of a user equipment 115, for example the Global Positioning System (GPS) or positioning methods based on information obtained within the mobile radio communications system 100. If the position of a user equipment 115 is known at the time of the collection of a user equipment transmission sample, further information may be deduced. For example, by logging the position of the user equipments at the sampling of all or many of the user equipment transmission samples, the actual coverage area may be discerned, and any coverage holes identified.

Logging of Path Loss

In order to adjust the power of the signals transmitted into the different active directions, the path loss to the different locations in the cell 105 for signals transmitted into different directions may be logged during the DoP-information collection (cf. FIG. 2, wherein measurement results have been plotted vs. path loss). Based on the path loss data, the transmission power of a signal transmitted in a certain direction can be adjusted to a level which guaranties a sufficient downlink quality also for locations having a high path loss. In this manner, the total transmitted power can be minimized with maintained coverage area.

Dedicated Channels

Although the above description refers to beam-forming of the common channels, the dedicated channels of a radio base station 110 employing the invention may also be beam-formed. For beam-forming of the downlink part of the dedicated channels, one of the following methods may advantageously be used:

1. Use beam-forming weights calculated from DoA-estimation performed on the uplink part of the dedicated channel, regardless of whether the resulting beam is included in the active area as defined above.
2. Measure the received power of the uplink part of the dedicated channel in different parts of the active area, and select for transmission of the downlink dedicated channel the common-channel direction for which the received power is the strongest.
3. Transmit the dedicated channel in the entire active area, without using any information obtained from measurements on the uplink part of the session.

Blocking of Directions

The antenna pattern adaptation of the common channels provided by the invention opens up for the possibility of blocking certain directions for transmission, for example in order to reduce inter-cell interference. This may be particularly useful for overcoming the problem of so called pilot pollution in WCDMA. Pilot pollution typically occurs in urban environments where the cell sizes are small, when the radio base station 110 has Line of Sight (LOS) propagation in some direction, for example along a street. If the situation is unfortunate, the common pilot channels can be heard several cells away. By blocking the LOS direction, the interference in neighbouring cells can efficiently be reduced. When identifying directions that should be blocked, information obtained from user equipments 115 regarding the signal strength received in a particular direction (or at a particular position) from different radio base stations 110 may be used. When selecting active directions in step 303, any blocking of directions would have to be taken into account. A direction may manually be indicated to the radio base station 110 as being "blocked"—for example as part of cell planning Alternatively, information about which directions to block could be obtained in a radio base station 110 from measurements performed by other radio base stations 113 which serve cells 105 wherein the transmission in a particular direction causes interference, or from user equipments 115. The decision on blocking of a particular direction could preferably be performed by a node in the mobile radio communications system 100, which could preferably have access to interference measurements made by radio base stations 110 and/or user equipments 115 in different cells 105 of the system 100. Such a node could for example, in a WCDMA system, be a Radio Network Controller (RNC). Alternatively, the decision be made by the radio base station 110 itself.

The above description has been made in terms an antenna system 113 of a radio base station 110. However, the invention will also be applicable to other stationary radio transmitters that are arranged to transmit common channel signalling to user equipments, such as for example repeaters, or relay nodes in a multi-hop network.

By adapting the antenna pattern used for the transmission of common channels in accordance with collected DoP-information, the power consumption of the radio base station 110 may be reduced while maintaining the cell size. Alternatively, the size of a cell 105 may be increased with maintained power consumption, since the power used for the transmission of the common channels may be focused into a limited number of directions, and the common channels could therefore be made to reach further if the intensity in a particular direction is increased. Moreover, the interference in the neighbouring cells will be reduced, and therefore, the capacity of the mobile radio communications system 100 may be increased.

The invention is applicable to all standards of mobile radio communications, including GSM, CDMA, WCDMA, OFDM-based standards etc. One skilled in the art will appreciate that the present invention is not limited to the embodiments disclosed in the accompanying drawings and the foregoing detailed description, which are presented for purposes of illustration only, but it can be implemented in a number of different ways.

The invention claimed is:

1. A method of improving the performance of a mobile radio communications system comprising at least one stationary radio transmitter for communicating with user equipments in the communications system, wherein the stationary radio transmitter is connected to an antenna system for which the antenna pattern can be varied, the method comprising:
   receiving direction-of-propagation information relating to a plurality of user equipment transmission samples, wherein a user equipment transmission sample includes information relating to at least one direction of propagation by which successful communication between a user equipment and the stationary radio transmitter has been established at a particular point in time;
   selecting, based on the direction-of-propagation information, active directions for the communication of common channels from the stationary radio transmitter; and
   adjusting the antenna pattern used for communication of common channels in accordance with the selected active directions in a manner so that the gain of at least one direction which has not been selected as active is lower than the gain of the selected active directions.

2. The method of claim 1, wherein the stationary radio transmitter serves a nominal cell area; and
   the adjusting is performed in a manner so that transmission power in at least one direction which is not selected as an active direction is lower than the transmission power required for successful communication with a user equipment located at a distance from the stationary radio transmitter, wherein said distance is smaller than a distance between the stationary radio transmitter and a border of the nominal cell area in the at least one direction.

3. The method of claim 1, wherein
the information relating to a direction of propagation includes information relating to at least one of azimuth, elevation or polarization of a communicated signal.

4. The method of claim 1, further comprising measuring the direction of arrival at the stationary radio transmitter of radio signals transmitted to the stationary radio transmitter from at least one user equipment in order to obtain at least part of the direction-of-propagation information.

5. The method of claim 1, further comprising
recording information relating to the direction of departure of a radio signal transmitted from the stationary radio transmitter; and
associating the recorded information with at least one user equipment transmission sample originating from a user equipment having received the radio signal.

6. The method of claim 5, wherein
the recording includes a direction identity in a signal transmitted from the stationary radio transmitter to the user equipment, the direction identity identifying the direction(s) into which the radio signal was transmitted.

7. The method of claim 1, wherein the method further comprises
obtaining the information relating to directions of arrival from simulations based on estimated radio propagation properties of the area surrounding the stationary radio transmitter.

8. The method of claim 1, further comprising
identifying a set of directions clusters comprising active directions and generating a cluster matrix based on the identified clusters; and wherein
the adjusting of the antenna pattern includes adjusting the antenna pattern so that the antenna pattern corresponds, as well as possible, to the cluster matrix.

9. The method of claim 1, wherein the step of selecting includes
identifying strong directions of transmission for a set of relevant user equipment transmission samples;
comparing the directions of transmission for different user equipment transmission samples in order to identify superfluous directions; and
selecting directions that have not been identified as superfluous as the active directions.

10. The method of claim 1, wherein a nominal coverage area of the stationary radio transmitter is divided into a plurality of direction space sections in a manner so that each direction of propagation is covered by a direction space section, further comprising
identifying, for the directions of the user equipment samples, which direction space section(s) cover the directions of the user equipment samples;
and wherein
the adjusting of the antenna pattern comprises adjusting the antenna pattern to cover at least one direction space section.

11. The method of claim 1, wherein the method further comprises
blocking a direction for transmission of common channels.

12. The method of claim 1, further comprising
temporarily altering the antenna pattern so that the transmission power of at least one direction that is not selected as active is temporarily enhanced in order to detect a user equipment that is not covered by the antenna pattern obtained in the step of adjusting.

13. The method of claim 12, further comprising, if a random access message is received from a user equipment in a temporarily enhanced direction:
checking whether the random access message has been received in a direction covered by the un-altered antenna pattern, and if not, include the temporarily included direction in the antenna pattern.

14. The method of claim 12, wherein
the step of temporarily altering is performed by sweeping a beam over directions to be temporarily included.

15. The method of claim 1, further comprising
measuring a path loss of a signal transmitted between the stationary radio transmitter and a user equipment;
adjusting the power of common channel transmission in accordance with the measured path loss in a direction included in a user equipment transmission sample of said user equipment.

16. Apparatus for improving the performance of a mobile radio communications system wherein the mobile radio communications system comprises at least one user equipment and at least one stationary radio transmitter connected to an antenna system for which the antenna pattern can be varied, the apparatus comprising:
a receiver configured to receive direction-of-propagation information relating to a plurality of user equipment transmission samples, wherein a user equipment transmission sample includes information relating to at least one direction of propagation by which successful communication has been established at a particular point in time between a user equipment and a first stationary radio transmitter connected to an antenna system for which the antenna pattern can be varied;
a selecting circuit configured to select, based on the direction-of-propagation information, active directions for the communications of common channels from the first stationary radio transmitter; and
an adjusting circuit connectable to the antenna system of the first stationary radio transmitter and configured to adjust the antenna pattern used for communication of common channels from the antenna system of the first stationary radio transmitter in accordance with the selected active directions in a manner so that the gain of at least one direction which has not been selected as active is lower than the gain of the selected active directions.

17. The apparatus of claim 16, wherein
the receiver is connectable to the antenna system of the first stationary radio transmitter in a manner so that direction-of-propagation information may be determined from radio signals received by the stationary radio transmitter.

18. The apparatus of claim 16, wherein
the receiver is connectable to the antenna system of the first stationary radio transmitter in a manner so that direction-of-propagation information may be received from one or several user equipments.

19. The apparatus of claim 16, wherein
the receiver is connectable to a node in the mobile radio communications system in a manner so that direction-of-propagation information may be received from said node.

20. The apparatus of claim 16, wherein the apparatus is included in a radio base station.

21. A user equipment for communication within a mobile radio communications system comprising at least one stationary radio transmitter, wherein the user equipment is configured to:
receive a first radio signal transmitted from a stationary radio transmitter;

identify a direction identity included in the first radio signal, the direction identity comprising at least one of an azimuth angle, elevation, polarization, and other directional information for identifying a direction into which the first radio signal was transmitted at the stationary radio transmitter; and send a second radio signal to the stationary radio transmitter, wherein the second radio signal is indicative of said direction identity.

* * * * *

UNITED STATES PATENT AND TRADEMARK OFFICE
CERTIFICATE OF CORRECTION

| | | |
|---|---|---|
| PATENT NO. | : 8,494,588 B2 | Page 1 of 1 |
| APPLICATION NO. | : 12/667817 | |
| DATED | : July 23, 2013 | |
| INVENTOR(S) | : Medbo et al. | |

It is certified that error appears in the above-identified patent and that said Letters Patent is hereby corrected as shown below:

In the Specification

In Column 1, Line 52, delete "know," and insert -- known, --, therefor.

In Column 4, Line 12, delete "105," and insert -- 110, --, therefor.

In Column 4, Line 67, delete "110" and insert -- 115 --, therefor.

In Column 6, Line 51, delete "know." and insert -- known. --, therefor.

In Column 7, Line 51, delete "105" and insert -- 115 --, therefor.

In Column 10, Line 21, delete "100" and insert -- 800 --, therefor.

In Column 10, Line 22, delete "100" and insert -- 800 --, therefor.

In Column 13, Line 59, delete "planning" and insert -- planning. --, therefor.

In Column 13, Line 62, delete "113" and insert -- 110 --, therefor.

Signed and Sealed this
Eleventh Day of February, 2014

Michelle K. Lee
*Deputy Director of the United States Patent and Trademark Office*